United States Patent [19]

Wilman

[11] Patent Number: 4,623,247
[45] Date of Patent: Nov. 18, 1986

[54] DOCUMENT SCANNERS

[75] Inventor: Hugh Wilman, Potters Bar, England

[73] Assignee: The British Library Board, London, England

[21] Appl. No.: 682,170

[22] Filed: Dec. 17, 1984

[30] Foreign Application Priority Data

Dec. 24, 1983 [GB] United Kingdom ............... 8334480

[51] Int. Cl.⁴ ..................... G03B 27/62; G03B 27/04
[52] U.S. Cl. ...................................... 355/75; 355/25; 355/82
[58] Field of Search .............................. 355/25, 75, 82

[56] References Cited

U.S. PATENT DOCUMENTS

| | | | |
|---|---|---|---|
| 2,236,303 | 3/1941 | Skinner et al. | 355/75 |
| 3,195,430 | 7/1965 | Young | 355/25 |
| 3,224,352 | 12/1965 | Valette et al. | 355/82 |
| 3,415,600 | 12/1968 | Yarbrough | 355/75 |
| 3,712,729 | 1/1973 | O'Brien | 355/25 |

Primary Examiner—Monroe H. Hayes
Attorney, Agent, or Firm—Gifford, Groh, VanOphem, Sheridan, Sprinkle & Dolgorukov

[57] ABSTRACT

A document scanner includes a wedge-shaped scanner housing (16, 18), vertically movable on a main housing (10) to locate an inclined scanned window against a document resting on a trough-like document support (14) beneath the scanner housing. The scanner housing is manually movable up and down for location against and removal from a document to be copied, and counterbalancing means are provided within the main housing to facilitate such vertical housing movement.

8 Claims, 2 Drawing Figures

DOCUMENT SCANNERS

FIELD OF THE INVENTION

This invention concerns document scanners.

BACKGROUND TO THE INVENTION

A document scanner is described in my copending U.S. application Ser. No. 549,252, filed 11-4-83 which has a housing with a wedge section at least one face of which comprises a window which can be positioned against the page of a book with the ridge of the wedge in the fold of the book. This housing cooperates with a V-shaped trough in which the book will rest, the angle of the trough corresponding to the included angle of the wedge shaped housing. Relative movement between the wedge shaped housing and the trough allows the book page to be brought into intimate contact with the window through which the page of the book is to be viewed for scanning purposes.

In my aforementioned application drive means is described for moving either the V-shaped book support in an inward direction or the wedge shaped housing in a downward direction to effect the relative movement.

It is an object of the present invention to provide an improved mechanism for achieving the said relative movement.

SUMMARY OF THE INVENTION

According to the present invention, in a document scanner comprising:

1. a housing having a wedge shaped section at least one face of which comprises a window which can be positioned against a page of a book with the ridge of the wedge in the fold of the book,
2. lamp means for illuminating the page positioned against the window,
3. a scanner adapted to scan the page which is visible through the said window to generate an electrical video signal corresponding to the information carried by the page, and
4. a V-shaped trough forming a book support in which a book will rest, the angle of the trough at least generally corresponding to the included angle of the wedge shaped housing section and alignable or aligned therewith so that a book resting in the trough can be sandwiched between the faces of the wedge and the sides of the trough, an improvement comprises
  i. guide means by which the wedge shaped housing section is constrained to move in a vertical direction up and down, and
  ii. counter balance means to compensate for the weight of the wedge shaped housing section to facilitate the manual vertical raising and lowering of the wedge shaped housing section relative to the V-shaped book support.

DETAILED DESCRIPTION OF THE PREFERRED EMBODIMENT

Figure 1:
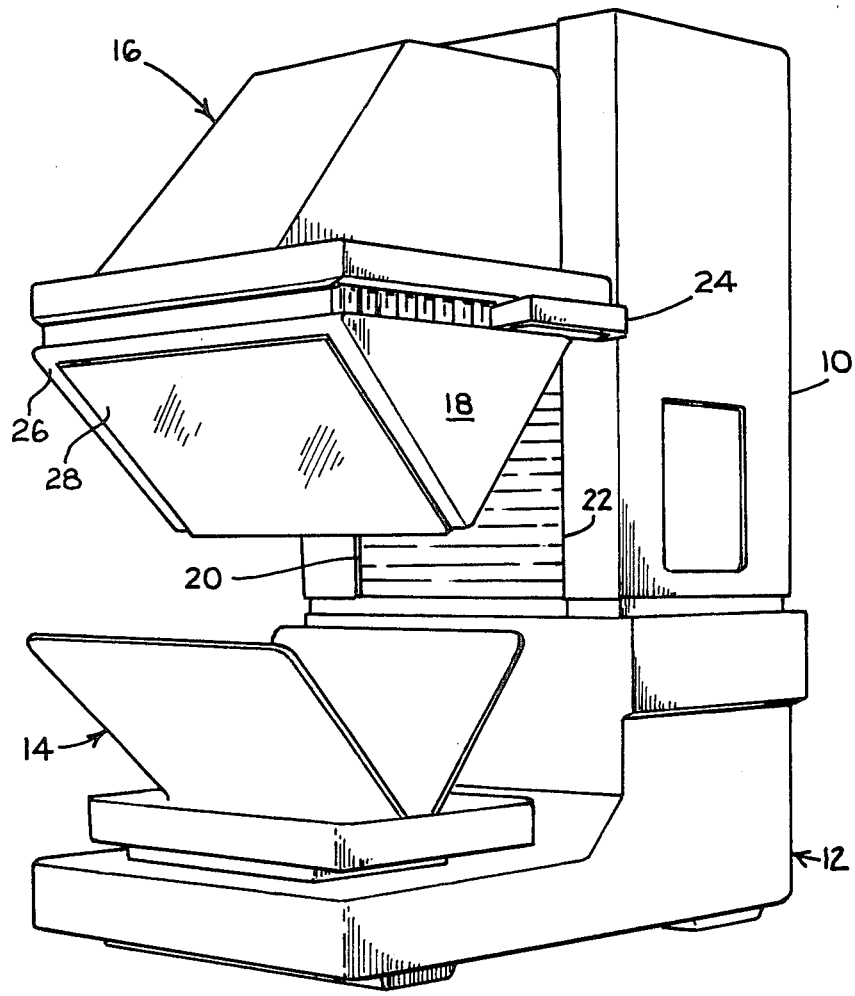
Figure 2:
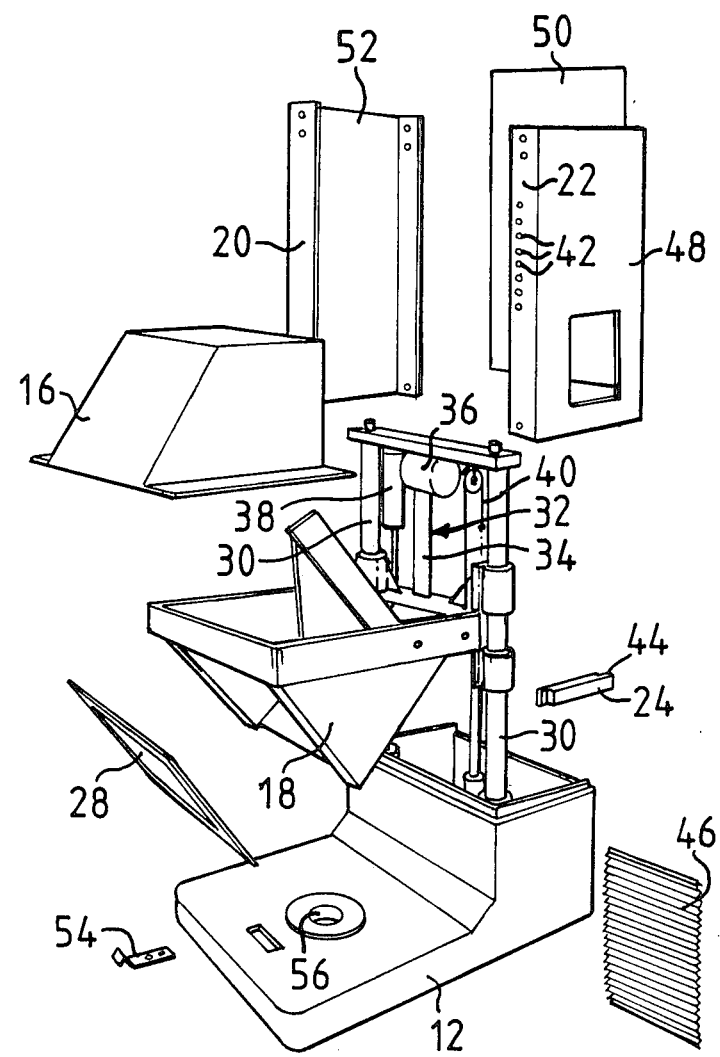

The invention will now be described by way of example with reference to the accompanying drawing, in which:

FIG. 1 is a perspective view of a document scanner in accordance with the invention, and FIG. 2 is an exploded view of the scanner.

The document scanner shown in the drawings includes a generally vertical housing 10 extending from a base assembly 12 on which is mounted a V-shaped document carrier generally indicated at 14. (The document carrier is not shown in FIG. 2). From the housing 10 extends a housing unit 16 containing a scanning mechanism (not shown) and which includes a wedge shaped section 18, one face 26 of which contains a viewing window 28 through which the scanner can view and scan a page of a book located on the V-shaped carrier 14.

The housing 16 is slidable along vertical guides 30 (FIG. 2) located inboard of two vertical panel edges 20 and 22 forming part of the housing 10. The guides form rails for the housing unit 16.

Protruding from the side of the housing unit 16 is a handle 24 by which an operator can raise and lower the unit 16 including its lower wedge shaped section, 18.

Within the housing 10 is located a counter balance mechanism so that the effective weight of the unit 16 is reduced so as to facilitate the raising and lowering of the unit.

Braking of the unit 16 at intermediate and raised positions may be effected by means of friction between it and the guides 30 or a rack and pawl mechanism (not shown) may be incorporated into the handle 24 so that upon gripping the handle 24 or a pistol grip associated therewith, the pawl is released to allow for upward and downward movement of the housing unit 16.

The counter-balance mechanism shown in FIG. 2 uses a device 32 which has a belt 34 one end of which is connected to the unit 16 and the other end of which is wound on a spool inside a casing 36 fixed to the scanner frame. As the belt is pulled out, a mechanism inside the casing 36 keeps the belt in tension and the belt thus exerts an upward pull on the housing unit 16, 18. A suitable device 32 is a Tensator balance.

To damper movement of the housing unit 16 an airpot damper 38 is positioned between the section 18 and the scanner frame.

A fine balance adjustment mechanism 40 is also provided which by the addition of small weights or tensioning of a spring, allows the balanced weight of the unit 16 to be adjusted to obtain precise balance.

To brake and lock the unit 16, FIG. 2 shows a series of holes 42 in the panel edge 22, and a spring-loaded plunger 44 on the handle 24. To move the unit 16, the handle 24 is grasped and the plunger 44 is retracted. The unit 16 is then moved until the plunger 44 engages with a different one of the holes 42 where the unit 16 is locked so that it cannot move while scanning takes place.

The front of the housing 10 below the unit 16, is closed by a pleated cover 46, the top edge of which moves with the unit.

The components which are active in scanning a document are omitted from FIG. 2. FIG. 2 does however show the casing panels 48, 50 and 52 which form the walls of the vertical housing 10. FIG. 2 also shows a detent spring 54 which is used to provide positive location of the document carrier 14, when this is rotated around a central point axis 56 formed in the base 12.

I claim:

1. In a document scanner which has a housing having a window through which a document can be illuminated and scanned to produce a photocopy of the document, the improvement comprising:

said housing having a wedge-shaped section having at least two faces and a window being provided in at least one face of said wedge-shaped section;

a V-shaped trough being disposed vertically below said wedge shaped section of the housing and having two opposing sides to form a book support in which a book will rest, the angle formed by said sides at least generally corresponding to the included angle of the wedge-shaped section of the housing; and positioning means comprising:

guide means for constraining the wedge-shaped section to movement generally in vertical direction;

manually operable means for vertically moving the wedge-shaped section relative to the V-shaped trough, along the guide means and between at least a raised position, in which the wedge-shaped section is spaced apart from the V-shaped trough, and a lowered position, in which the window of the wedge-shaped section is brought closely adjacent an open book resting in said V-shaped trough; and counterbalance means to compensate for the weight of said housing to facilitate said manual vertical movement of the housing's wedge-shaped section relative to the said book support.

2. A document scanner according to claim 1, and further comprising a vertical main section of the housing.

3. A document scanner according to claim 2 wherein said guide means comprises guides vertically disposed in said vertical main section of the housing.

4. A document scanner according to claim 2, wherein said counterbalance means is disposed in said vertical main section of the housing.

5. A document scanner according to claim 1, wherein braking of said wedge-shaped section in said raised position is enabled by friction between said wedge-shaped section and said guide means.

6. A document scanner according to claim 1, and further comprising a braking means for holding the wedge-shaped section in said rasied position wherein said braking means is operable by a control incorporated in said manually operable means.

7. A document scanner according to claim 1, including a vertical main housing having guides for up and down movement of the wedge shaped section thereon.

8. A document scanner according to claim 7, wherein the counterbalance means is accomodated in the main housing.

* * * * *